United States Patent [19]
O'Keefe

[11] Patent Number: 5,361,313
[45] Date of Patent: Nov. 1, 1994

[54] TWO-MODE REMOTE FIBER OPTIC SENSOR

[75] Inventor: Christian V. O'Keefe, Linthicum, Md.

[73] Assignee: Martin Marietta Corporation, Bethesda, Md.

[21] Appl. No.: 60,778

[22] Filed: May 11, 1993

[51] Int. Cl.$^5$ .............................................. G02B 6/16
[52] U.S. Cl. ....................................... 385/11; 385/12; 385/28; 250/227.17; 250/227.14; 250/227.11
[58] Field of Search ...................... 250/227.11, 227.14, 250/227.17, 227.18, 227.19; 385/11, 12, 24, 28, 38, 123, 146

[56] References Cited

U.S. PATENT DOCUMENTS

| | | | |
|---|---|---|---|
| 3,590,374 | 6/1971 | Evans et al. | 324/96 |
| 4,652,129 | 3/1982 | Martinelli | 250/227.19 |
| 4,694,243 | 9/1987 | Miller | 324/96 |
| 4,743,752 | 5/1988 | Olsen et al. | 250/227 |
| 4,915,468 | 4/1990 | Kim | 350/96.15 |
| 4,932,783 | 6/1990 | Kersey et al. | 356/45 |
| 5,026,984 | 6/1991 | Gerdt | 250/227.21 |
| 5,034,679 | 7/1991 | Henderson et al. | 324/96 |
| 5,072,110 | 12/1991 | Lu et al. | 250/227.14 |
| 5,112,137 | 5/1992 | Wickerhsheim et al. | 374/131 |
| 5,158,720 | 10/1992 | Levy | 264/1 |
| 5,168,538 | 12/1992 | Gillespie | 385/123 |
| 5,183,338 | 2/1993 | Wickersheim et al. | 374/131 |

OTHER PUBLICATIONS

"Characterization of Series of Modal Domain and Polarimetric Fiber Optic Sensors" by Christian V. O'Keefe and B. Boro Djordjevic. Concept presented at Fifth Annual Fiber Optics Review Conference and Smart Materials and Structures Workshop at Virginia Tech., Blacksburg, Va., 4/1-4/91 (8 pages).

"In-situ Acoustical and Optical Waveguide Sensors", by C. V. O'Keefe, B. B. Djordjevic and B. N. Ranganathan, Paper Presented at the 1st European Conf., on Smart Structures and Materials, Glasgow 1992, Session (12), pp. 391-393.

"Interrogation of a Remote Elliptical-Core Dual-Mode Fiber Strain Sensor by Using a Tandem Interferometer Configuration", Bohnert et al., Optics Letters, vol. 17, No. 9, May 1, 1992, pp. 694-696.

"Tension-Induced Modal Birefringence in a Single-Fiber Interferometric Strain Gauge", Ohtsuka and Tanaka, Fiber and Integrated Optics, vol. 9, pp. 245-253, May 1990.

Primary Examiner—John D. Lee
Assistant Examiner—John Ngo
Attorney, Agent, or Firm—Gay Chin; Bruce M. Winchell; Brian J. Rees

[57] ABSTRACT

A device for remote sensing utilizing fiber optic techniques is presented. This device makes use of multimode optic fibers in conjunction with light polarized in multiple directions. The device presents a platform which is insensitive to phenomena outside of the remote sensing region while capable of detecting and analyzing multiple phenomena within the sensing region. The device is also capable of inspecting multiple remote sensing regions simultaneously.

8 Claims, 5 Drawing Sheets

TWO-MODE REMOTE FIBER OPTIC SENSOR

BACKGROUND OF THE INVENTION

1. Field of the Invention

The general field of the invention is the area of fiber optics. In this case fiber optics are being used a sensing devices, more particularly, for remote sensing. Specifically, multi-mode fibers, which are sensitive to exterior phenomena, are used in conjunction with single mode fibers, which are insensitive to exterior phenomena to detect and analyze multiple phenomena remote locations.

2. Description of Related Art

Miller et al, U.S. Pat. No. 4,694,243 discloses a sensor capable of measuring physical quantities such as pressure, acceleration, and electrical currents by passing polarized and unpolarized light through an optical sensor which modifies the light in proportion to the magnitude of the physical quantities being measured.

Yoshihiro Ohtsuka Satoshi Tanaka in a May 1990 article in the Fiber and Integrated Optics, Volume 9, pp 245-253, discloses a Tension Induced Modal Birefringence in a Single Fiber Interferometric Strain Gauge.

Bohnert et al in Optics Letters, Vol. 17, No. 9, May 1, 1992 discloses an Interrogation of a remote elliptical core dual mode fiber strain sensor by using a tandem interferometer configuration to do remote sensing of strain.

Gerdt, U.S. Pat. No. 5,026,984 discloses methods for sensing temperature, pressure and liquid level by fiber optics in fuel tanks where there is a spark hazard present.

Kersey et al, U.S. Pat. No. 4,932,783 discloses methods for minimizing the polarization induced signal fading in an interferometric fiber optic sensor by interrogating the sensor using an input polarization modulated source.

Olsen U.S. Pat. No. 4,743,752 discloses a fiber optic remote sensor using fiber optics to link the signals or to provide power to remote electromechanical sensors.

There are a number of patents which disclose methods for measuring physical parameters by using fiber optic sensors such as: Henderson et al U.S. Pat. No. 5,034,679; Wickersheim et al U.S. Pat. No. 5,183,338; Wickersheim et al U.S. Pat. No. 5,112,137; Gillespie U.S. Pat. No. 5,168,538; Levy U.S. Pat. No. 5,158,720; and evans U.S. Pat. No. 3,590,374.

There have been disclosures which describe the use of single mode polarization preserving fibers which base the detection of perturbations on the distinct effect these perturbations have on each of the slow and fast polarization axes. These devices are limited in the amount of information they are capable of gathering and thereby limited on the number of parameters they can detect. This limitation restricts the detail with which a region can be inspected.

There have also been disclosures of devices which utilize two-mode and single mode fibers in combination to provide a sensing region which is sensitive to phenomena within in that region. These devices do use single mode fiber to insulate the information gathered within the sensing region from phenomena which occur outside of the sensing region. These devices do not disclose the use of polarized light as an element or restriction to the type of light transmitted through the fibers. Again, this type of device is limited to the amount of information it is capable of gathering and thereby the number of parameters it is capable of detecting.

A last area of related art is that disclosed by Kim et al, U.S. Pat. No. 4,915,468 (1990). Kim et al. discloses the general notion of a device which utilizes both polarized light and multimode fibers. This device is capable of sensing multiple parameters and thereby gathering more data than previous sensing devices. Kim et al. does not however teach one methods or devices for sensing in remote locations utilizing multiple parameter techniques. The invention of the instant application improves upon the general device disclosed by Kim et al. by providing a device which is capable of performing multiple parameter sensing in remote locations.

SUMMARY OF THE INVENTION

It is an object of the invention to provide a fiber optic sensor for remote sensing.

It is another object of the invention to provide a fiber optic sensor which is capable of detecting multiple parameters in remote locations.

This invention fulfills the need for a remote sensor which is capable of accurately detecting multiple phenomena while keeping the sensor size to a minimum. The invention provides this type of sensor by utilizing the combination of polarized light and multi-mode fiber optics. The object of remote sensing is to provide a sensing region which will accurately detect the phenomena under study while keeping the gathered information insensitive to phenomena outside of the sensing region. The use of single mode fibers outside of the sensing region provides this insensitivity required for the remote sensing. The connections between the single mode fibers and the two-mode fibers provides the means by which the gathered information may be transmitted to the processing means in a manner such that this information may be preserved.

These and other objects of the present invention will become apparent to those skilled in this art from the detailed description of the present invention contained herein.

DETAILED DESCRIPTION OF PREFERRED EMBODIMENTS

Figure 1:
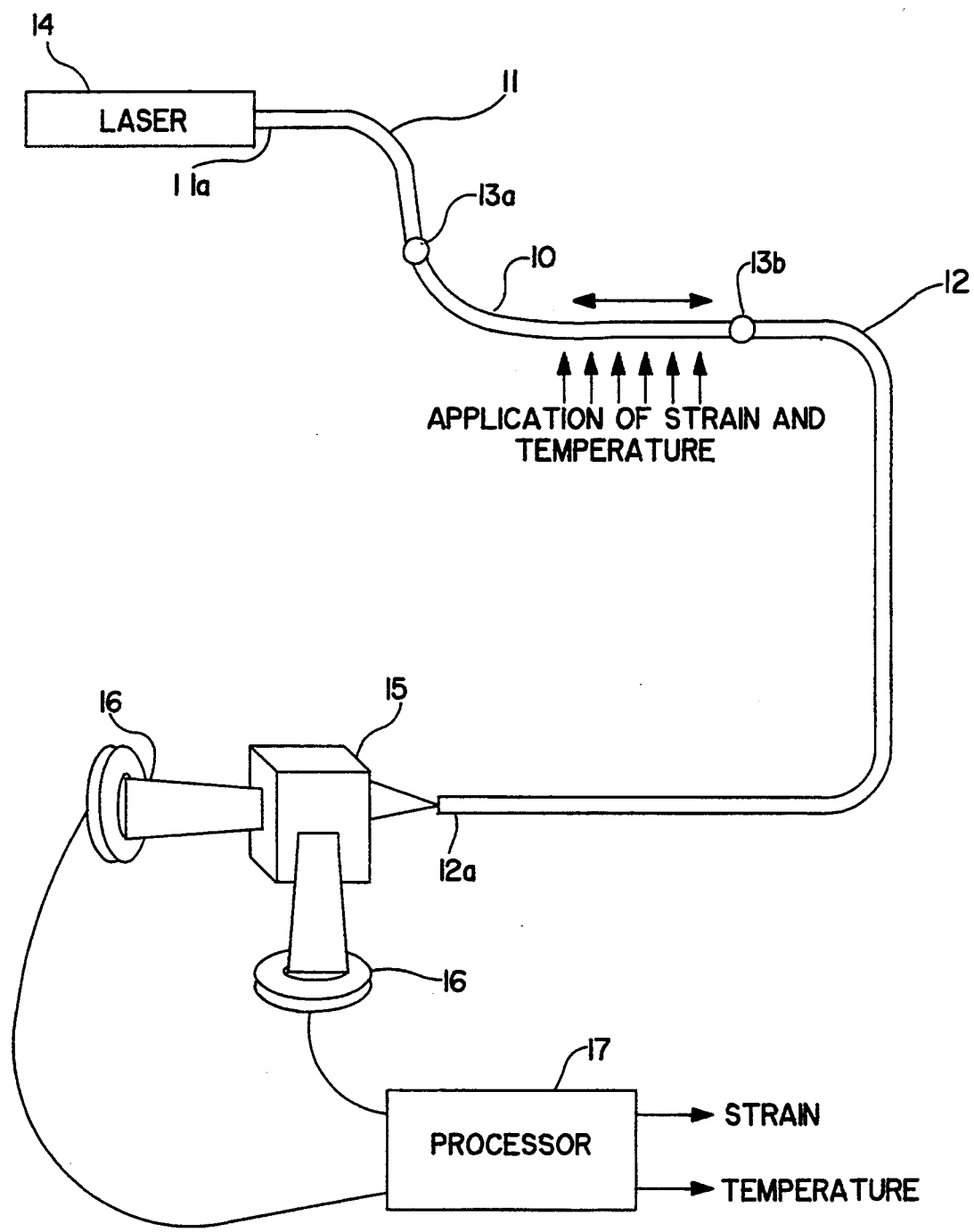
FIG. 1 is a first embodiment of an optical configuration of a through transmission design of the invention.
Figure 2A:
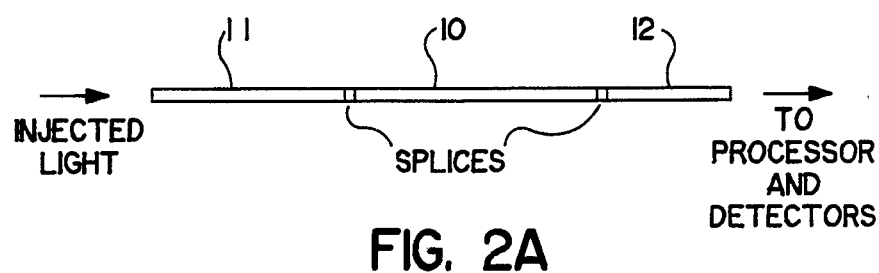
FIGS. 2A and 2B are enlarged sections of FIG. 1 detailing the process which occurs along the fiber of the invention.
Figure 2B:
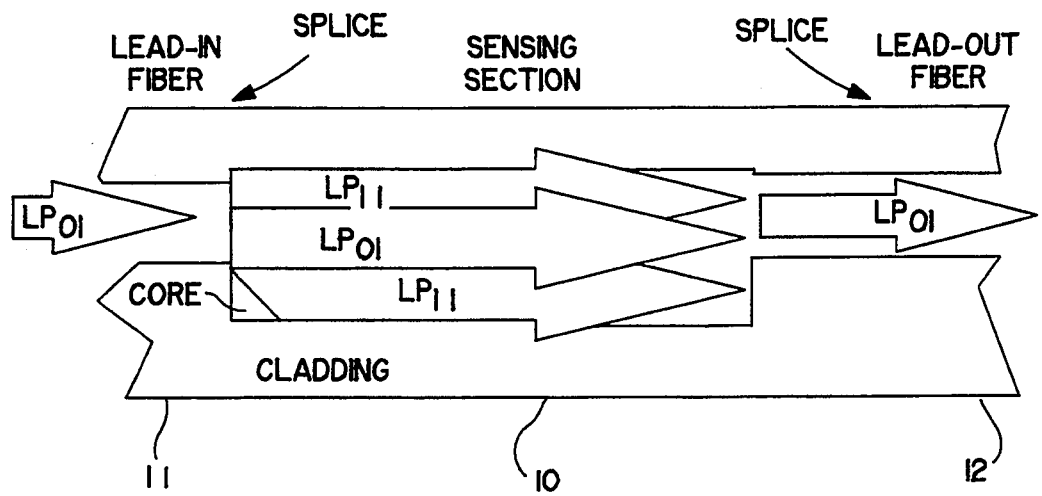

The basis of the present device and method is the desire to use optical fibers to sense multiple phenomena using a single optical waveguide and a single light source. The first step is to be able to detect and analyze the effects of two separate and distinct phenomena, such as temperature and strain. Because there are two unknowns two equations are needed to solve for those two unknowns.

APPENDIX A

A sensor system in which the two outputs are linearly independent such that they respond differently to the same perturbations can potentially be used to concurrently measure and separate the magnitude of the perturbations. One can start with the phase response of most homodyne-type fiber optic sensors such that:

$$I = I_0[1 + M \cos(\theta)] \tag{A.1}$$

where the voltage or current output signal of the sensor is proportional to the irradiance of the light (I) upon the photodetector. In equation A.1, M is a measure of the fringe contrast and is proportional to the difference between the irradiance of a bright fringe and a dark fringe such that:

$$M = \frac{I_L - I_D}{2 I_0} = \frac{I_L - I_D}{I_L + I_D} \tag{A.2}$$

where
$I_L$ is the irradiance of a bright fringe and
$I_D$ is the irradiance of a dark fringe
Meanwhile the phase term $\theta$ is given by:

$$\theta = \beta_1 z_2 - \beta_2 z_2 \tag{A.3}$$

where if $z_1 = z_2 = z$
$\theta = \beta' z$
where $\beta' = \beta_1 - \beta_2$

As the sensor is perturbed it undergoes a change in its phase $\Delta\theta$ which can be independently related to the perturbations on the fiber. In a sensor system monitoring multiple parameters the phase changes of an output can be given by:

$$\Delta\theta_j = \frac{2\pi}{\Lambda\xi_{1j}}\xi_1 + \frac{2\pi}{\Lambda\xi_{2j}}\xi_2 + \frac{2\pi}{\Lambda\xi_{3j}}\xi_3 + \ldots + \frac{2\pi}{\Lambda\xi_{ij}}\xi_i \tag{A.4}$$

Here $\Delta\theta_j$ is the phase for the $j^{th}$ output of the sensor system. The perturbations are given by $\xi_i$ and the response of the sensor to the particular perturbation $\xi_i$ is given by $$\frac{2\pi}{\Lambda\xi_{ij}}$$

where $\Lambda\xi_{ij}$ is the amount of perturbation required to induce a full fringe cycle in the output signal. Now restricting the situation to a two-parameter, two output sensor system the output phase changes are:

$$\Delta\theta_1 = \frac{2\pi}{\Lambda\xi_{11}}\xi_1 + \frac{2\pi}{\Lambda\xi_{21}}\xi_2 \tag{A.5}$$

$$\Delta\theta_2 = \frac{2\pi}{\Lambda\xi_{12}}\xi_1 + \frac{2\pi}{\Lambda\xi_{22}}\xi_2$$

These two linear equations can be rewritten in matrix form as:

$$\begin{bmatrix} \Delta\theta_1 \\ \Delta\theta_2 \end{bmatrix} = \begin{bmatrix} \frac{2\pi}{\Lambda\xi_{11}} & \frac{2\pi}{\Lambda\xi_{21}} \\ \frac{2\pi}{\Lambda\xi_{12}} & \frac{2\pi}{\Lambda\xi_{22}} \end{bmatrix} \begin{bmatrix} \xi_1 \\ \xi_2 \end{bmatrix} \tag{A.6}$$

Using shorthand notation this matrix equation can be rewritten as:

$$\vec{\Delta\theta} = (\Lambda)\vec{\xi} \tag{A.7}$$

Now by multiplying both sides of this equation by the inverse of the characteristic fiber sensor matrix ($\Lambda$) an equation for the perturbations is obtained:

$$\vec{\xi} = (\Lambda)^{-1}\vec{\Delta\theta} \tag{A.8}$$

which relates the inverse of the characteristic fiber sensor matrix with the two outputs of the sensor system to yield the magnitude of the perturbations.

This invention describes a variety of fiber optic sensor configurations which can simultaneously measure and differentiate between several perturbations on one or more controlled fiber optic sensing portions(s) of the sensor. The sensing portion or gauge length is the portion of the sensor between points 13a and 13b in FIG. 1 of the drawings. In essence the portion of the sensor which consists of fiber 10 in FIG. 1 is the sensing portion of the sensor, thereby creating a controlled gauge length. This gauge length can be varied during manufacture by regulating the length of the two mode fiber which is used to create the sensor. This controlled gauge length is also shown in the configurations shown in FIG. 3 (fiber 10), FIGS. 4 and 5 (fiber 22), and FIGS. 6 and 7 (fibers 28) of the drawings.

If comparison to the Kim et. al. and Olsen et. al. patents, the present invention results in a dual parameter fiber optic sensor with a controlled gauge length, remote sensing optical fiber component. The Kim et. al. patent discusses the dual parameter sensing aspect of this type of sensor. It does not discuss the creation of a controlled gauge length sensor optic fiber. In relation to the present invention, the Olsen et. al. patent is a totally different type of remote sensor. It does not use an optical fiber as a sensing mechanism, instead it simply uses the optical fibers to provide optical energy to power a separate, non-optical sensor. It also allows for the use of the optical fibers to convey signals from the non-optical or discrete sensor back to a detector.

A sensor which is sensitive along its entire length, including the portions leading out from the source to the desired sensing region and leading from the region to the detector/processor, has limited usefulness. Such a sensor, although generally easier to develop and construct, will be limited to applications or situations in which the portions of the sensor going to and from the sensing region can be well protected from any perturbations. As a result, it is highly desirable to have a sensor which has insensitive lead-in/lead-out portions leading into the sensing region from the source and leading out from the sensing region to the detector/processor. This situation is illustrated in the figures of the drawings. This submission outlines an approach which was developed and tested for the creation of a controlled sensing region in a dual two-mode sensor utilizing insensitive lead-in/lead-out fibers.

The ability to create a controlled sensing region in the sensor also offers the possibility to greatly expand the usefulness of the sensor in other ways. It is not enough to have a multi-parameter sensor. This sensor must also have the ability to perform distributed or quasi-distributed sensing. In distributed sensing, it is possible to monitor parameters along any portion of the sensor without defined sensing regions or gauge lengths. In quasi-distributed sensing, the sensor is divided into sections with each section either acting as a sensing region with a defined gauge length or as an insensitive lead-in/lead-out link between two sensing regions. With both approaches, it is mandatory that the sensor system can discriminate between perturbations occurring at different sensing regions.

Full implementation of quasi-distributed sensing relies on the ability to create a controlled sensing region in the sensor. By having a series of controlled sensing regions, either connected directly in series or linked together with insensitive optical fiber links, it is possible to implement a quasi-distributed sensor. The resulting sensor with a controlled gauge length (sensing region) also has the capability to be linked in a series or a parallel arrangement such that multiplexing techniques can be used to monitor each sensing region independently.

We begin with a dual mode polarization preserving birefringent fiber. Light, which is polarized in a first direction and in a second direction orthogonal to the first is injected into the fiber. The light polarized in the first direction, upon entering the fiber splits into two modes which we will call 1V and 2V. The light in the second polarized direction upon entering the fiber splits into two modes also which we will call 1H and 2H. Inherent in two mode fiber is the fact that each mode propagates along the fiber at a different phase velocity. These different velocities translate to a phase difference between the two modes and a resultant interference pattern. We will call this phase difference in the first polarization direction alphaV and the phase difference in the second polarization direction alphaH. As the fiber is acted upon by outside phenomenon under analysis the phase difference changes resulting in delta alphaV and delta alphaH. The change in phase difference causes the intensity in the interference pattern to change. The change in phase delta alphaV and delta alphaH can be solved for and the intensity change can be optically detected. Also inherent in the fiber, as a function of its birefringence, is the fact that each individual polarization component is affected differently when the outside phenomenon act on the fiber therefore each change in phase difference, delta alphaV and delta alphaH, will be distinct. This allows for two equations in the two unknowns to be established, one defining delta alphaV and one defining delta alphaH, and two unknowns, in this case temperature and strain.

A light source is placed at a proximal end of the fiber and a light beam is injected into the fiber. The light source may consist of a HeNe laser or a laser diode but is not necessarily limited thereto and any other source which produces an equivalent effect is contemplated. The data to be used in the two equations is gathered by separating the light beam into each individual polarization at the distal end by way of light splitting means. The light splitting means may consist of a polarizing beam splitter or a polarization-splitting coupler however any means which produce an equivalent effect are contemplated. Each polarization component is then fed to an optical detection device. Such detection device may be a photodetector.

A first preferred embodiment of the present invention and a refinement of the basic device and method of sensing multiple phenomena by way of a single optical waveguide and light source is a device and method of sensing at a remote and discrete location.

The first preferred embodiment, as shown in FIG. 1, comprises a length of optical fiber, 10, specifically a polarization preserving dual mode birefringent fiber which would be placed in a location one wishes to observe, which is attached, at points 13a and 13b, through some type of splicing method such as fusion splicing, at each end of the dual mode fiber, 10, each said end to be situated at the boundaries of the remote location being observed, to an individual length of polarization preserving single mode birefringent fiber, 11 and 12. The end, 11a, of the first length of single mode fiber, 11, is placed next to and aligned with the light source, 14, such that light is injected into the first length of single mode fiber, 11, along both polarization axes. The end, 12a, of the second length of single mode fiber, 12, is placed next to and aligned with the light splitting means, 15, such that the light is separated into its linear polarization states. Each portion of light resulting from the splitting of the light is sent to an optical detection device, 16, such as a photodetector. The information gathered by the photodetectors is then sent to a processing means, 17, capable of extracting quantitative information of the effects of multiple perturbations or parameters and processing the gathered information.

It is necessary that the two mode fiber and the second length of single mode fiber be spliced such that the polarization axes of the two fibers are aligned. It is preferred that the first length of single mode fiber and the two mode fiber are spliced such that the polarization axes are aligned or are at 45 degrees to each other.

Figure 3:
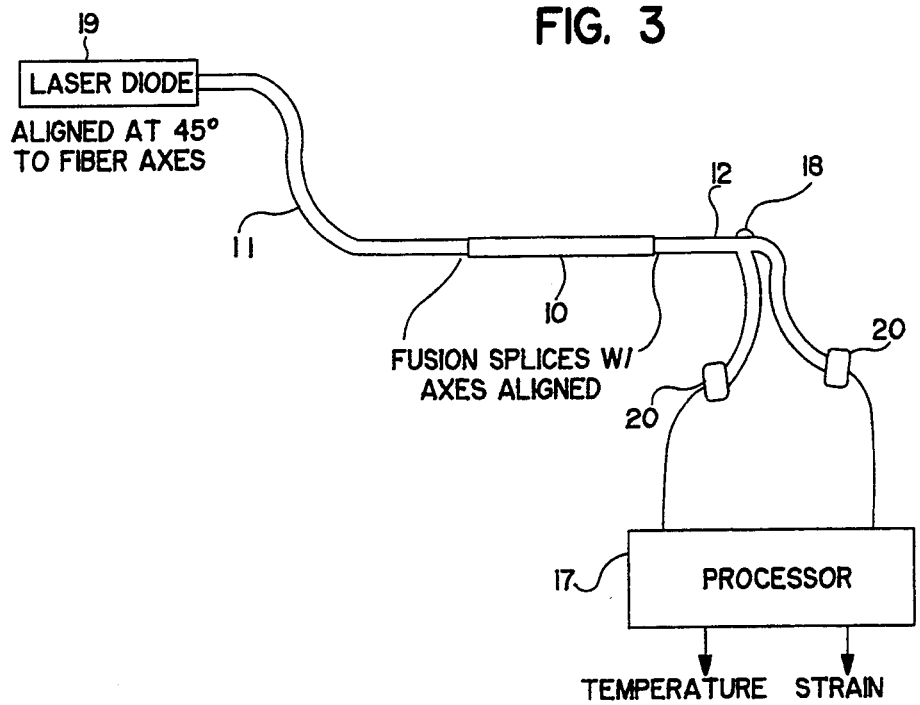
FIG. 3 is a second embodiment of an optical configuration of a through transmission design of the invention.

FIG. 3 describes a second implementation of the preferred embodiment described above. In this implementation the light source, 19, is a laser diode, the light splitting means, 18, is a polarization-splitting coupler and the optical detection devices, 20, pigtailed photodetectors.

Figure 4:
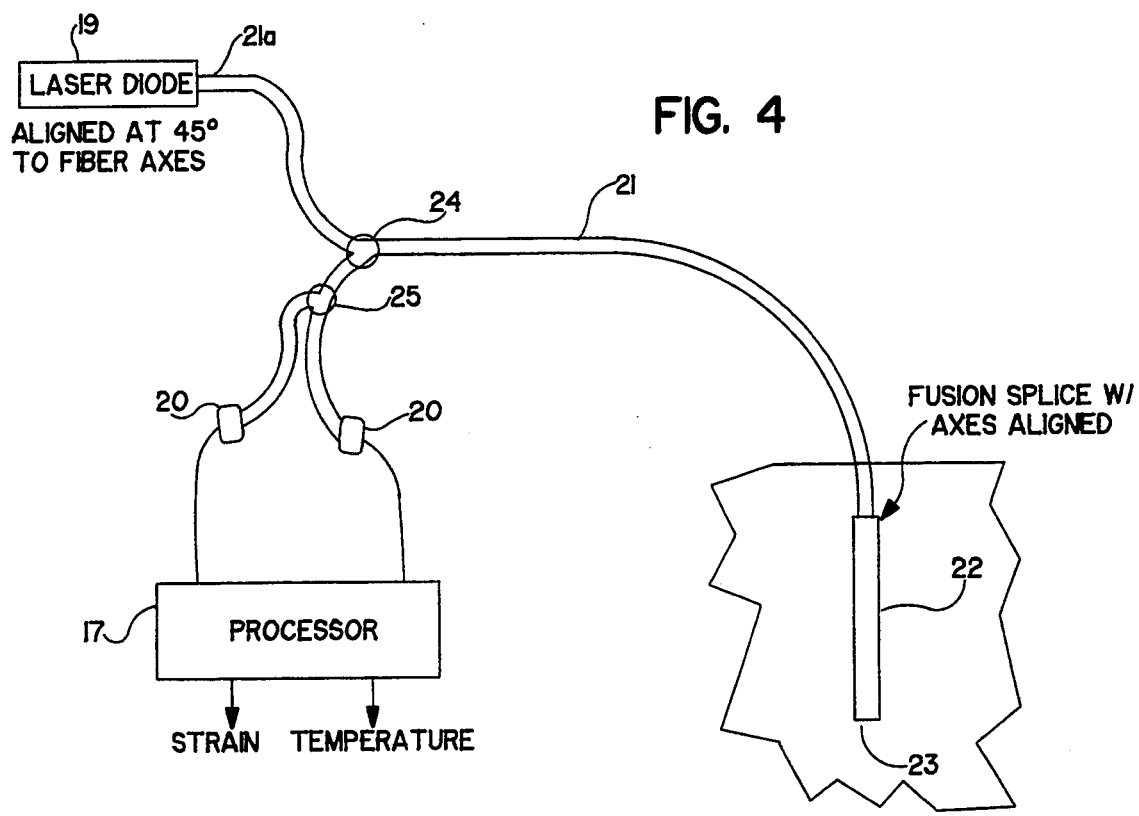
FIG. 4 is an embodiment of an optical configuration of the reflective design of the invention.
Figure 5A:
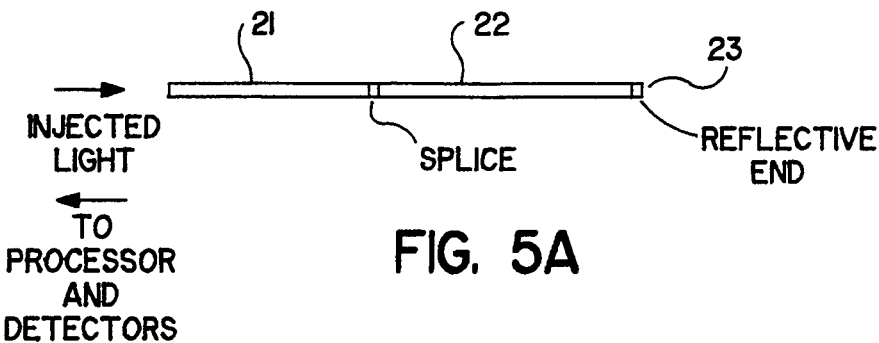
FIGS. 5A, 5B and 5C are enlarged sections of FIG. 4 detailing the process which occurs along the fiber of the invention.
Figure 5B:
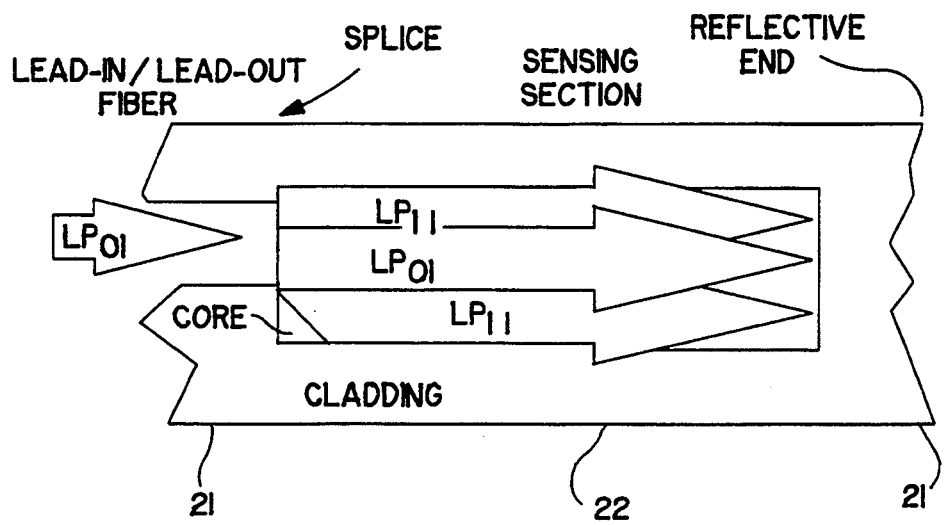
Figure 5C:
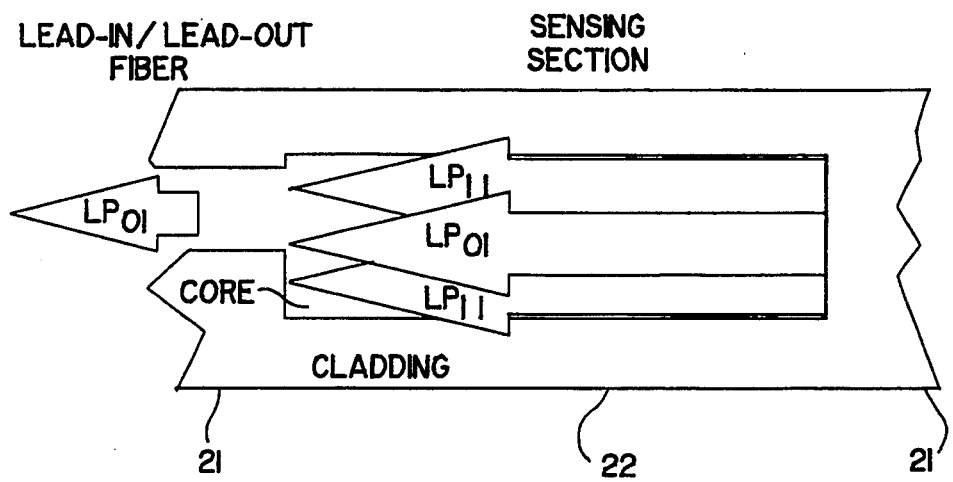

FIG. 4 describes a second preferred embodiment of the invention. In this embodiment the light is reflected and not passed through the two mode fiber. In this embodiment a single mode polarization preserving fiber, 21, is spliced to a two mode polarization preserving fiber, 22. The two fibers must be spliced such that the polarization axes of the two fibers are aligned. The first end, 21a, of the single mode fiber, 21, is aligned with the light source 19 such that the light is injected into fiber 21 along both polarization axes. The two mode fiber has a reflective end, 23, which reflects the incoming light. The single mode fiber, 21, also comprises a means for extracting some of the reflected light from the fiber, 24, in this case a polarization-preserving coupler. Situated next to the light extracting means, 24, such that is will receive the extracted light is a light splitting means, 25, capable of splitting the light into both polarizations. In this case the light splitting means is a polarization-splitting coupler. Each portion of light resulting from the splitting of the light is sent to an optical detection device, 20, such as a pigtailed photodetector. The information gathered by the photodetectors is then sent to a processing means, 17, capable of extracting quantitative information of the effects of multiple perturbations or parameters and processing the gathered information.

Figure 6:
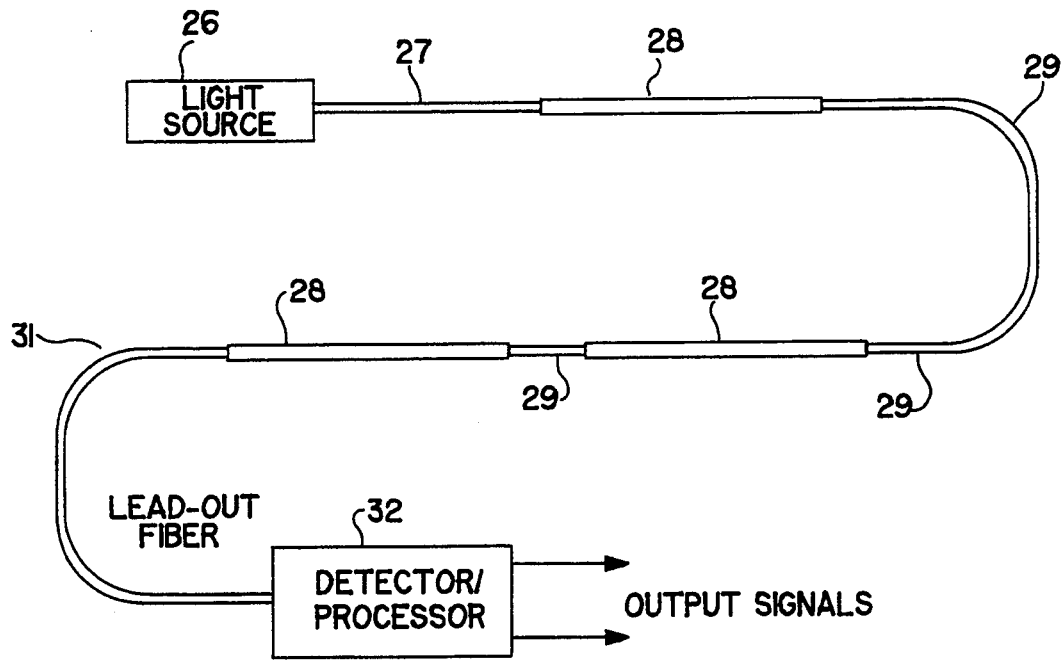
FIG. 6 is an embodiment of a first multiple sensor design.

A third embodiment of the invention, as described in FIG. 6, contemplates a multiple sensor arrangement utilizing the same theory as described in the first preferred embodiment of FIG. 1 and FIG. 3. In this embodiment a light source, 26, provides light, in same manner as described above, to a single mode polarization preserving fiber, 27. The light is then passed to a two mode polarization preserving fiber, 28, which is then passed to a single mode polarization preserving fiber, 29, which is then passed to a two mode polarization preserving fiber, 28, which is then passed to a single mode polarization preserving fiber, 29, which is then passed to a two mode polarization preserving fiber, 28, and then to a single mode polarization preserving fiber, 31, and then to detector/processor means, 32. In this embodiment all connections between single mode fibers, 29, and two mode fibers 28 must be such that the polarization axes of the two fibers are aligned. The same is true for the connection between the two mode fiber, 28, and the single mode fiber 31. In this embodiment the detector/processor means comprises the elements described above as light splitting means, optical detection means and the processor means. The two mode fibers are considered the sensing fibers and are to be placed in the regions which are to be monitored. This embodiment does not contemplate a limit on the number of sensing fibers to be placed in series.

Figure 7:
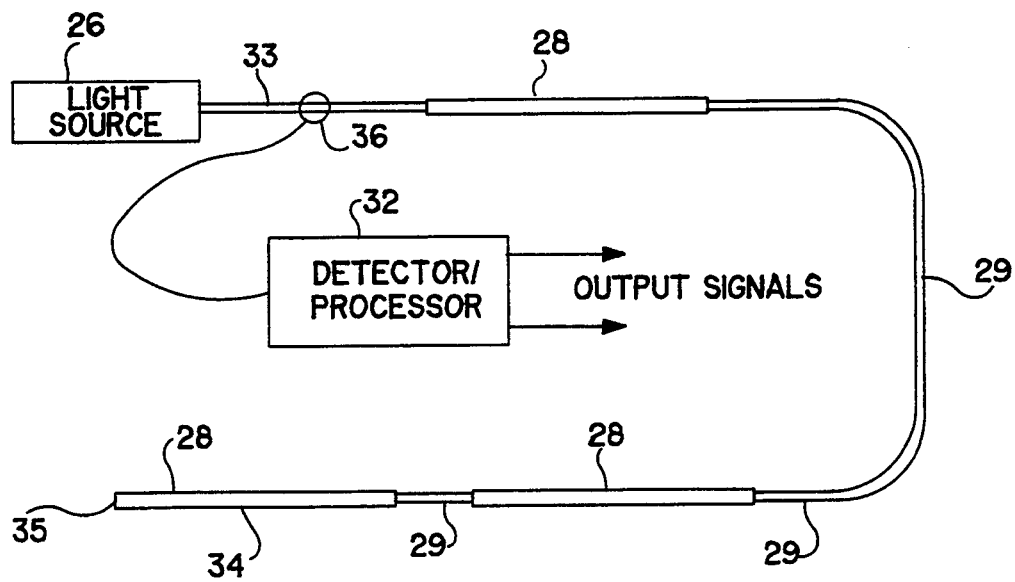
FIG. 7 is an embodiment of a second multiple sensor design.

A fourth embodiment of the present invention, as described in FIG. 7, contemplates a multiple sensor arrangement utilizing the same theory as described in the second preferred embodiment of FIG. 4. In this embodiment, a single mode polarization preserving fiber, 33, acts as a lead in/lead out fiber which is connected to a two mode polarization preserving fiber, 28, which serves as the sensing fiber. Multiple sensing fibers, 28, may be combined in series by single mode polarization preserving fibers, 29, which serve as linking fibers. The last sensing fiber in the string, 34, will have a reflective end, 35, to reflect incoming light back along the sensing and linking fibers. As stated above, all connections between single mode and two mode fibers must be such that the polarization axes are aligned. Light source 26 is situated next and aligned with fiber 33 such that light is injected into fiber 33 along both polarizations. Fiber 33 comprises light extracting means 36. These means are the same as described above. Detector/processor means 32 are the same as described for FIG. 6.

APPENDIX B

IMPLEMENTATION OF A DUAL TWO-MODE FIBER OPTIC SENSOR

It was seen that the sensing mechanism within each polarization state of a dual two-mode fiber optic sensor consists of the interference between two energy modes along a polarization axis of an optical fiber. This interference results from differences in the phase between the two energy modes along each polarization axis such that perturbations on the fiber change this phase difference. For the lead-in and lead-out fibers to be insensitive to perturbations they must carry these two beams such that they propagate with the same propagation constant and they take the same path. This necessitates carrying both beams in a single mode.

1. Common Mode Perturbation Elimination in Lead-In and Lead-Out Fibers

A mathematical argument for the ability of the controlled gauge length configuration to eliminate the effects of perturbations on the lead-in and lead-out fibers can be formed. Within the lead-in fiber, it is possible to start with a single beam along each polarization axis which propagates from the source to the sensing fiber. At the sensing fiber, this single beam or energy mode can then be split into the two energy modes necessary to create a modal domain sensor along each polarization axis of the sensing dual mode fiber. Therefore any perturbations on the lead-in fiber which may affect the phase of the light within the fiber will affect only a single energy mode. Any shifts in the phase of the single energy mode in the lead-in fiber will produce a common phase shift on the two sensing energy modes in the two-mode sensing fiber. Since the sensor output is only affected by the differential phase shifts between its own two energy modes, any common phase shifts in those modes will not be detected. Mathematically, the propagation term for the single beam in the lead-in fiber can be expressed as:

$$exp[i(\omega t - \beta_{single} z)] \quad (B.1)$$

where $\beta_{single}$ is the propagation constant for the only mode which can be sustained within a single mode fiber Any perturbation effects on this fiber as it has traveled the length of the lead-in fiber, $L_{in}$, can be given by a phase term, $\theta_{per-in}$, resulting in an electric field whose phase at the end of the lead-in fiber is given by:

$$exp[i(\omega t - \beta_{single} L_{in} - \theta_{per-in})] \quad (B.2)$$

At the sensing fiber, this mode is split into the two sensing modes which have the propagation terms:

$$exp[i(\omega t - \beta_{01} z_{sense} - \beta_{single} L_{in} - \theta_{per-in})]$$

$$exp[i(\omega t - \beta_{11} z_{sense} - \beta_{single} L_{in} - \theta_{per-in})] \quad (B.3)$$

where
  $\beta_{01}$ is the propagation constant for the LP$_{01}$ mode within the two-mode fiber,
  $\beta_{11}$ is the propagation constant for the LP$_{11}$ mode within the same fiber,
  $z_{sense}$ is the distance the modes have propagated from the beginning of the sensing fiber.

Taking into account the distance traveled within the sensing fiber and the effects of perturbations on the two sensing modes, the phase terms at the end of this section of the sensor can be written as:

$$exp[i(\omega t - \beta_{01} L_{sense} - \beta_{single} L_{in} - \theta_{per-in} - \theta_{per-01})]$$

$$exp[i(\omega t - \beta_{11} L_{sense} - \beta_{single} L_{in} - \theta_{per-in} - \theta_{per-11})] \quad (B.4)$$

where
  $L_{sense}$ is the length of the sensing fiber,
  $\theta_{per-01}$ is the phase shift on the LP$_{01}$ mode due to perturbations on the sensing fiber, and
  $\theta_{per-11}$ is the phase shift on the LP$_{11}$ mode due to perturbations on the sensing fiber At the junction between the sensing fiber and the lead-out fiber, the two sensing modes are recombined forming a single mode within the lead-out fiber. This single mode actually contains the two sensing beams or modes, but now superimposed on each other with the phase terms for the two beams at the end of the lead-out fiber given by:

$$exp[i(\omega t - \beta_{single}L_{out} - \beta_{01}L_{sense} - \beta_{single}L_{in} - \theta_{per\text{-}in} - \theta_{per\text{-}01} - \theta_{per\text{-}out})]$$

$$exp[i(\omega t - \beta_{single}L_{out} - \beta_{11}L_{sense} - \beta_{single}L_{in} - \theta_{per\text{-}in} - \theta_{per\text{-}11} - \theta_{per\text{-}out})] \quad \text{(B.5)}$$

where $L_{out}$ is the length of the lead-out fiber, and $\theta_{per\text{-}out}$ is the phase shift due to perturbations on the lead-out fiber Upon a photodetector the two beams interfere such that the resulting intensity and hence photodetector output is proportional to:

$$exp[i(\beta_{01}L_{sense} - \beta_{11}L_{sense} + \theta_{per\text{-}01} - \theta_{per\text{-}11})] \quad \text{(B.6)}$$

where $\beta_{01}L_{sense} - \beta_{11}L_{sense}$ is constant, and $\theta_{per\text{-}01} - \theta_{per\text{-}11}$ is a function of the perturbation experienced by the sensing fiber It can be seen that the interference term and thus the photodetector output is independent of perturbations on the lead-in or lead-out fibers.

2. Lead-In Fiber to Sensing Fiber Joint

The ability to use a single mode fiber as the lead-in fiber is dependent on the ability to generate the two sensing energy modes from a single energy mode. Generation of two modes from a single mode can be achieved by launching the light into the dual mode fiber in such a manner that excitation conditions are met for both modes. For conventional modal domain sensors this is generally accomplished by focusing a propagating free space laser beam into an optical fiber. In most circumstances, this free space laser beam is the lowest energy mode emitted by a laser. This energy mode, the TEM$_{00}$ mode, has a spatial Gaussian profile which is similar to the center portion of the J$_0$ Bessel function distribution of the LP$_{01}$ mode in the optical fiber. Thus if the single, LP$_{01}$, mode is also injected into the dual mode fiber with the proper launch conditions, this single mode can give rise to two energy modes, a LP$_{01}$ and a LP$_{11}$.

To illustrate the basis for the assumption given above, first the similarity between the LP$_{01}$ mode and a free space TEM$_{00}$ mode will be illustrated and then the conditions under which the TEM$_{00}$ mode can give rise to the LP$_{01}$ and LP$_{11}$ modes in the two-mode fiber will be determined. The electric field amplitude of the TEM$_{00}$ mode or fundamental Gaussian beam is given by:

$$E = E_0 \frac{\omega_0}{\omega(z)} \exp\left\{ i\omega t - i[kz - \eta(z)] - \rho^2 \left( \frac{1}{\omega^2(z)} + \frac{ik}{2R(z)} \right) \right\} \quad \text{(B.7)}$$

where $\omega(z)$ is the radius of the beam $\omega_0$ is the radius of the waist (smallest width of a focused beam)

$\eta(z)$ is a phase term which varies slowly with z and at the focal point of a focused beam equals zero $R(z)$ is the radius of curvature of the beam. This also varies slowly with z and at the focal point equals $z_0$ This equation can be divided into terms related to the spatial distribution of the electric field and the phase or propagation of the field, $$E_{Spatial} = E_0 \frac{\omega_0}{\omega(z)} \exp\left( -\rho^2 \frac{1}{\omega^2(z)} \right) \quad \text{(B.8)}$$

$$E_{Phase} = \exp\left\{ i\omega t - i\left[ kz - \eta(z) + \frac{\rho^2 k}{2R(z)} \right] \right\} \quad \text{(B.9)}$$

such that $$E = E_{Spatial} E_{Phase} \quad \text{(B.10)}$$

Equation B.8 can be expanded in terms of a power series to yield:

$$E_{Spatial} = E_0 \frac{\omega_0}{\omega(z)} \left\{ 1 - \left(\frac{\rho}{\omega(z)}\right)^2 + \frac{1}{2!}\left(\frac{\rho}{\omega(z)}\right)^4 - \frac{1}{3!}\left(\frac{\rho}{\omega(z)}\right)^6 + \ldots \right\} \quad \text{(B.11)}$$

Now taking the equation for the LP$_{01}$ mode in the core of an optical fiber, $$E = AJ_0(u\rho)exp\{i\omega t - i\beta z\} \quad \text{(B.12)}$$

it can also be divided into terms related to the spatial distribution of the electric field and the phase or propagation of the field.

$$E_{Spatial} = AJ_0(u\rho) \quad \text{(B.13)}$$

$$E_{Phase} = exp\{i\omega t - i\beta z\} \quad \text{(B.14)}$$

The spatial distribution can also be expanded in terms of a power series to obtain:

$$E_{Spatial} = A\left\{ 1 - \frac{1}{2^2}(u\rho)^2 + \frac{1}{2^4}\frac{1}{(2!)^2}(u\rho)^4 - \frac{1}{2^6}\frac{1}{(2!)^4}(u\rho)^6 + \ldots \right\} \quad \text{(B.15)}$$

If the free space beam is focused, at the focal point $\eta(z)=0$ and $R=\infty$ such that $$\frac{\rho^2 k}{2R(z)} \to 0,$$

the resulting TEM$_{00}$ phase term can be given as:

$$E_{Phase} = exp\{i\omega t - ikz\} \quad \text{(B.16)}$$

A comparison of the phase terms for the TEM$_{00}$ and the LP$_{01}$ modes (equations B.16 and B.14) reveals that they are very similar differing only in the value of their propagation constants. Likewise, comparing the power series expansion of the spatial distribution for each mode (equations B.11 and B.15) where at the focal point $\omega(z) = \omega_0$ the power series also reveal a strong correlation. This correlation is sufficient to make use of the numerical calculations for the excitation efficiency of various fiber optic modes by a focused TEM$_{00}$ mode.

These calculations reveal that it is possible to excite the $LP_{01}$ ($HE_{11}$) mode in the two-mode fiber with efficiencies up to 100%, excluding the fiber to air interface losses, with the excitation efficiency decreasing with increasing offsets between the incident beam and the two-mode fiber axis. These calculations also reveal that the $HE_{21}$ mode can be excited and indicate that either $TE_{01}$ or $TM_{01}$ modes may also be excited. Actually with an offset between the incident beam axis and the two-mode fiber axis, greater efficiencies in the excitation of the $HE_{21}$ and $TE_{01}$ or $TM_{01}$ modes will occur. A combination of these modes will then create the proper $LP_{11}$ modes in the two-mode fiber. The ability of an incoming $LP_{01}$ mode to generate both the $LP_{01}$ and $LP_{11}$ modes in the two-mode fiber was verified through experimentation.

The lead-in fiber must meet other conditions. It must not be very sensitive to micro- or macro-bends, since these will change the amount of light injected into the sensing region. In turn, these changes will alter the perceived output phase state generated by the interference between the sensing modes. Since this sensor system relies on the creation of two effectively separate sensors, one along each polarization axis of the sensing fiber, it is necessary that energy is injected along both axes. Ideally, an equal amount of energy is launched along each axis. This can be achieved in a variety of ways, with the most common and reliable methods including the introduction of linearly polarized light at 45° to both axes or the launching of circularly polarized light into the fiber. In either case, a polarization maintaining fiber has to be used as the lead-in fiber. This is necessary to ensure that the light is carried to and injected into the sensing fiber with the proper polarization state.

If a non-polarization maintaining fiber is used, any perturbations on the lead-in fiber can change the polarization state of the light within the fiber. Changes in this polarization state will change the amount of light injected along each polarization axis in the sensing fiber, therefore amplitude modulating the output signal of the two outputs. This amplitude modulation will be very difficult to differentiate from signals resulting from perturbations on the sensing fiber.

3. Sensing Fiber to Lead-Out Fiber Joint

The lead-out fiber must meet some of the criteria imposed on the lead-in fiber, as well as form an integral part of the sensor signal extraction function. As stated in the previous section, sensor signal extraction is performed by spatially filtering the pattern generated from the interference between the two energy modes in the sensing fiber. For the creation of a controlled sensing region, this function has to be performed by the lead-out fiber. The lead-out fiber also has to efficiently and properly carry the light from the sensing region to the detector/processor.

Previously, sensor signal extraction was achieved by allowing the two energy modes to exit the end of the sensing fiber, to interfere in the far field, and to allow one of the resulting interference lobes to pass through a spatial filter. The light from this lobe then would fall upon a photodetector to generate the output signal. To create a localized sensing region, this spatial filtering function has to occur at the point at which the sensing fiber is joined to the lead-out fiber. Taking the equation for the electromagnetic field distribution of the two energy modes within the dual mode fiber, it is possible to determine the interference pattern within the fiber.

Once that has been done, it can be determined whether or not it is possible to spatially filter the field within the fiber such that an interference zone or lobe is passed. If that spatial filtering can be accomplished with the lead-out fiber, there would be no need for a separate spatial filter.

To determine whether interference lobes are formed within the two-mode fiber, the equations for the electromagnetic field distributions of the two energy modes within the two-mode fiber have to be taken. Using the expressions for y-polarized modes within the core region ($p < a$):

$$E_x = 0$$
$$E_y = AJ_l(up)e^{il\phi} \exp[i(\omega t - \beta z)]$$

$$E_z = \frac{u}{\beta} \frac{A}{2} [J_{l+1}(up)e^{i(l+1)\phi} + J_{l-1}(up)e^{i(l-1)\phi}]\exp[i(\omega t - \beta z)]$$

$$H_x = -\frac{\beta}{\mu\omega} AJ_l(up)e^{il\phi} \exp[i(\omega t - \beta z)]$$

$$H_y \approx 0$$

$$H_z = -\frac{iu}{\mu\omega} \frac{A}{2} [J_{l+1}(up)e^{i(l+1)\phi} - J_{l-1}(up)e^{i(l-1)\phi}]\exp[i(\omega t - \beta z)]$$

Now restricting attention to the modes propagating within the core and seeing that $\beta >> u$ or $w$ then $E_y >> E_z$ and $H_x >> H_z$. This leaves $E_y$ and $H_x$ as the dominant field components. Now taking just these two components, $$H_x = -\frac{\beta}{\mu\omega} AJ_l(up)e^{il\phi} \exp[i(\omega t - \beta z)]$$

it can be seen that they have the same propagation and spatial distribution characteristics. The only difference between the two are their amplitudes. Therefore, it is valid to only examine one of the components and assume that the other behaves in a similar manner. A plot of the amplitude of the $E_y$ field for the $LP_{01}$ and $LP_{11}$ modes shown in figure B.3 reveals that they do indeed overlap within the fiber. The resulting interference is similar to what is experienced in the far field if the both modes were allowed to propagate out from the end of the fiber. The continuity of the E and H fields across the boundary between the two fused cores will then allow for the generation of the $LP_{01}$ mode in the lead-out fiber. This was also proven through experimentation.

The lead-out fiber must also preserve the polarization separation between the two sensors within the single sensing fiber. This has to be done so that at the detector/processor unit, the two sensors can be separated via their polarization states, and can be independently monitored. Such as with the lead-in fiber, a polarization maintaining fiber must be used to accomplish this function. Unlike the lead-in fiber, it is imperative for the polarization axes of the lead-out fiber to be aligned with the polarization axes of the sensing fiber. Otherwise light from one sensor will mix and interfere with the second sensor. Obviously, as with the lead-in fiber, the lead-out fiber has to be fairly insensitive to micro- and macro-bending so that intensity modulations of the light are not confused with phase changes in the sensors' outputs.

4. Creation of Fiber Sensor Joints

For both the lead-in fiber to sensing fiber and the sensing fiber to lead-out fiber cases, it was assumed that there is a method for joining the fibers together at those points. Joining fibers together permanently and without adding bulkiness to the joining area is performed through a technique called fusion splicing. This method is used on a regular basis to join together two single mode or two multi-mode fibers. In particular, the fiber optics communications industry uses this technique when repairing fiber breaks or when installing new optical fiber lines. The mixing of two different fiber types such as joining a single mode fiber to a dual mode fiber is not done on a regular basis. The joining of a dual mode fiber to a single mode fiber is generally avoided since it results in the loss of light at the splice point. From a communications viewpoint losses are to be minimized. For the creation of the dual two-mode sensor system, this loss is acceptable especially if it is the result of light lost from only one of the two interference lobes, while the light from the other lobe is allowed to pass into the lead-out fiber.

Actual creation of a sensing region was performed using a manually operated fusion splicer. This fusion splicer, a Power Technology Corp. PFS-300, consisted of two x, y, z micrometer/piezoelectric actuator driven stages, vacuum and mechanical chucks, a microscope head, and a pair of fusion splice electrodes. The actual fusion process consisted of the following steps:

1) The ends of the two fibers to be fused together had about one and one-half inches of jacketing stripped away, were cleaned with ethanol and then cleaved, leaving about three quarters of an inch of exposed fiber core/cladding material on each end.
2) A laser beam was focused onto and injected into the end of one fiber.
3) The fibers were placed in the two vacuum/mechanical chucks such that one cleaved end from each fiber was separated by the other by less than one half of an inch.
3) The micrometer stages were used to align the two fibers until the two cleaved ends were almost touching and light was coupled from one fiber to the other.
4) A small prefuse current was sent to the arc electrodes to clean off the ends of the fibers.
5) The fibers were realigned.
6) The settings on the fusion splicer were established including the arc current, the arc duration, the arc ramp duration, the z-displacement, and the z-displacement time delay.
7) The fusion process was activated at which point the splicer:
   Ramped up the arc current.
   Waited until the z-displacement time delay had expired which allowed time for the ends of the fiber to heat up and soften.
   While continuing to arc a current across the electrodes, moved the fibers together by an amount equal to z-displacement setting.
   Stopped arcing at the end of the time set for "arc duration."
8) The amount of light emerging from the second fiber was then examined to see if good coupling between the two fibers had been established.

The steps necessary to create a controlled sensing region were:

1) The polarization of the light from the laser was rotated with a half-wave plate until it was aligned with one of the polarization axes of the polarization preserving single mode fiber. This was confirmed by allowing the light emitted from the end of the fiber to pass through a polarizer. If the light was not injected along one of the polarization axes, then any small perturbations on the fiber would change the intensity of the light passing through the polarizer.
2) The end of the single mode fiber from which the light was emerging was placed in the fusion splicer chuck. The cleaved end of a polarization preserving dual mode fiber was then placed in the other chuck.
3) The two fibers were then brought together until they almost touched and were laterally aligned such that light passed from one to the other.
4) The polarization state of the light emitted from the dual mode fiber was then analyzed with a polarizer. From this analysis, the amount of angular misalignment which existed between the polarization axes of the single mode fiber and the dual mode fiber was determined.
5) One of the two fibers was then rotated by the amount required to align the polarization axes of the two fibers. Since this research was performed while the only fusion splicer available did not have a rotation stage, it was necessary to rotate the fiber by hand. Needless to say, this did not result in a precise rotation, and it was necessary to repeatedly laterally align the fibers, analyze the angular misalignment, and rotate the fibers. This was a very tedious process but with the proper equipment can be automated.
6) Once the fibers were both properly angularly and laterally aligned, their lateral alignment was adjusted slightly until it was seen that two modes were generated in and were emitted from the two-mode fiber.
7) At this point, the two fibers were fused together.
8) The amount of light emerging from the end of the dual mode fiber was examined to see if there was good coupling between the two fibers. The dual mode fiber was then perturbed by stretching it slightly and the interference pattern created by light emerging from the end of the fiber was examined to see if dual mode launching conditions had been met. If neither condition was met, the splice was not satisfactory and it was necessary to break it and start over again.

To connect the lead-out fiber the following procedures were used:

9) The free end of the dual mode fiber was placed in one fusion splicer chuck and one of the two ends from another single mode polarization preserving fiber was placed in the other chuck.
10) The same procedures stated above were used to both angularly and laterally align the two fibers.
11) At this point the two fibers were laterally aligned such that the single mode lead-out fiber would perform its spatial filtering. This was done by changing the lateral alignment between the two fibers while slightly stretching the dual mode fiber until a sinusoidal intensity fluctuation occurred in the light emerging from the lead-out fiber.
12) Again once the fibers were fused together, the amount of light emerging from the end of the lead-out fiber was measured to see if good coupling between the two fibers had been achieved. The dual mode fiber was also stretched slightly and the light from the lead-out fiber was analyzed to see if it followed the expected sinusoidal variation in intensity. If neither condition was met, then it was necessary to break the splice and perform steps 8–12 over again.

5. Test Results of Dual Two-Mode Fiber Optic Sensor with a Controlled Gauge Length Once a sensor was created, it was tested to see if it could measure and separate the effects of both strain and temperature. Like the tests outlined in section four, this series of tests included the following:

Strain only test ($\Delta L \neq 0$ and $\Delta T = 0$)
Temperature only test ($\Delta L = 0$ and $\Delta T \neq 0$)
Simultaneous strain and temperature tests ($\Delta L \neq 0$ and $\Delta T \neq 0$)

A HeNe laser source was used to inject a linearly polarized $TEM_{00}$ beam into the single mode polarization preserving fiber. This afforded the best coupling of energy into the single mode lead-in fiber. A half-wave plate was used to ensure that the incoming light was polarized at 45° to both orthogonal fiber polarization axes. Alternatively, it was also possible to use a quarter-wave plate which would cause circularly polarized light to be injected into the lead-in fiber. In either case, the objective was to ensure that roughly equal portions of light were injected into each polarization axis. This was necessary so that the two sensors would have sufficient light to achieve a good and comparable signal to noise ratio. The sensing portion of the fiber which had a gauge length of 3.52 meters was placed in a fiber stretcher/temperature bath apparatus such as the one used to test the dual two-mode sensor without lead-in/out fibers in section four. The light emerging from the lead-out fiber passed through a polarizing beamsplitter onto two photodetectors. The beamsplitter was aligned with the polarization axes of the lead-out fiber such that the light from each polarization state or sensor would go to a different detector.

First the sensor system was tested to determine its ability to measure fiber elongation (strain). In this case the temperature on the fiber was kept constant ($\Delta T = 0$). While the fiber was strained, a digitizer was used to record the output signals of both sensors. The amount of elongation was also directly measured with both a dial gauge and with the micrometer scale which resulted in a measurement accuracy of $\Delta 20 = \mu m$. After each test, the fringe output from each sensor was analyzed on the digitizer to determine the phase changes in each output. The fiber was first elongated by the following amounts:

TABLE B.1

| Test No. 1 | Test No. 2 | Test No. 3 |
| --- | --- | --- |
| 2286 μm | 1295 μm | 559 μm |

The sensor system was then tested for its ability to measure changes in temperature ($\Delta T$ is not$=0$ and $\Delta L = 0$). The temperature was recorded immediately before the test began and immediately after it finished. The difference between the two readings was taken as the temperature change. Since the device used to measure the temperature had an accuracy of $+/-0.2°$ C., the overall uncertainty in the measurement was $+/-0.4°$ C. The temperature range over which this test could be performed was limited by the ability of the instrumentation to measure temperatures above 50° C. During the course of each test, the digitizer recorded the output signals from both sensors. The following temperature changes were imposed on the sensor and were recorded.

TABLE B.2

| Test No. 4 | Test No. 5 | Test No. 6 |
| --- | --- | --- |
| 7.7° C. | 9.5° C. | 21.2° C. |

The final series of tests involved testing of the sensor system for its ability to perform simultaneous measurements of strain and temperature changes. The first combined test consisted of the following scenario:

Start at a temperature of 34.1° C.
Half a minute into the test, elongation of the fiber began.
Fiber was stretched by 200 μm over the next two and one-half minutes.
Test ended 17 minutes after it began with the fiber at a temperature of 41.9° C.

The next five tests were combined into a single run in which the fiber was heated, its temperature was monitored and it was slowly stretched. The actual sequence is shown here:

Start at a temperature of 27.1° C.
During the first three and one-half minutes of the run the fiber was heated up to 31° C. and it was elongated by 100 μm.
Four and one-half minutes into the test, the water bath (and fiber) temperature was 32.8° C.
Six minutes into the test, the water bath (and fiber) temperature was 35.4° C. and the fiber had been elongated by 200 μm.
Twelve and one-half minutes into the test, the temperature was 44.9° C. and the fiber had been stretched by 400 μm.
The fiber continued to heat up to 48.8° C. at which point the run was terminated. This occurred 17 minutes into the run.

Since no markers were placed within the signal to indicate when an event had occurred such as a certain temperature rise or an elongation of the fiber, it was necessary to monitor the test as it proceeded and note the phase changes in real time. The strain/temperature tests are summarized in the table shown here with tests 8 through 12 consisting of the results of the combined run:

TABLE B.3

| Test No. 7 | Test No. 8 | Test No. 9 | Test No. 10 | Test No. 11 | Test No. 12 |
| --- | --- | --- | --- | --- | --- |
| 200 μm | 100 μm | 100 μm | 200 μm | 400 μm | 400 μm |
| 7.8° C. | 3.3° C. | 2.6° C. | 8.3° C. | 17.8° C. | 21.7° C. |

For each test the phase change of each sensor output was recorded. These are given here in table B.4.

TABLE B.4

| Test No. | Sensor One Phase in Deg (°) | Sensor Two Phase in Deg (°) |
| --- | --- | --- |
| 1 | 3960 | 2520 |
| 2 | 2160 | 1260 |
| 3 | 1080 | 720 |
| 4 | 450 | 720 |
| 5 | 562 | 855 |
| 6 | 1260 | 1935 |
| 7 | 900° | 990° |
| 8 | 360 | 405 |
| 9 | 315 | 360 |
| 10 | 810 | 990 |
| 11 | 1845 | 2160 |

TABLE B.4-continued

| Test No. | Sensor One Phase in Deg (°) | Sensor Two Phase in Deg (°) |
|---|---|---|
| 12 | 2160 | 2520 |

The inverse of the characteristic matrix of the sensing fiber was used to extract the strain and temperature changes. Again taking the characteristic matrix of the sensing fiber, a section of York HB800, calculating its inverse and applying the following formulas, the elongation (strain) and temperature changes can be determined.

$$\begin{bmatrix} \Delta L \\ L\Delta T \end{bmatrix} = <\Lambda>^{-1} \begin{bmatrix} \Delta\theta_1 \\ \Delta\theta_2 \end{bmatrix} \quad (B.17)$$

and $$\begin{bmatrix} \Delta L \\ \Delta T \end{bmatrix} = \begin{bmatrix} 1 & 0 \\ 0 & 1/L \end{bmatrix} \begin{bmatrix} \Delta L \\ L\Delta T \end{bmatrix} \quad (B.18)$$

Where the following inverse matrix was used.

$$<\Lambda_{York800}>^{-1} = \begin{bmatrix} 0.9678 \; \mu m/° & -0.6177 \; \mu m/° \\ -0.0366 \; (°C\text{-}m)/° & 0.0601 \; (°C\text{-}m)/° \end{bmatrix} \quad (B.19)$$

The results of applying these equations are summarized in Table B.5. The actual measured values for $\Delta L$ and $\Delta T$ are given in the columns labeled "Experimental" and the values calculated from the outputs of the sensor are given in the columns labeled "Calculated". The accuracy for directly measuring the parameters and phases was $\Delta L = \pm 20 \; \mu m$, $\Delta T = \pm 0.4°$ C., and $\Delta\theta = \pm 22.5°$

TABLE B.5

| | Results of Dual Sensor-Simultaneous Measurement of Strain and Temperature | | | |
|---|---|---|---|---|
| Test No. | Experimental $\Delta L$ in $\mu m$ | Calculated $\Delta L$ in $\mu m$ | Experimental $\Delta T$ in °C. | Calculated $\Delta T$ in °C. |
| 1 | 2286 | 2276 | 0.0 | 1.9 |
| 2 | 1285 | 1312 | 0.0 | -0.9 |
| 3 | 559 | 601 | 0.0 | 1.1 |
| 4 | 0 | -9 | 7.7 | 7.6 |
| 5 | 0 | 16 | 9.5 | 8.8 |
| 6 | 0 | 24 | 21.2 | 19.9 |
| 7 | 200 | 260 | 7.8 | 7.6 |
| 8 | 100 | 98 | 3.9 | 3.2 |
| 9 | 100 | 82 | 2.6 | 2.9 |
| 10 | 200 | 172 | 8.3 | 8.5 |
| 11 | 400 | 451 | 17.8 | 17.7 |
| 12 | 400 | 534 | 21.7 | 20.6 |

The effect of attaching single mode fiber to the dual mode fiber in the regions not being observed is that the light, which will split into two modes within the dual mode fiber, will travel in a single mode and therefore any outside phenomena which act on the single mode fiber will not cause a change in the phase difference in the two modes when they do in fact split into their respective modes. In other words, because the light is travelling in a single mode there is no phase difference to be affected and therefore, under the circumstances being observed and the analysis being performed outside phenomena acting on the single mode fiber have no effect on the change which will occur within the dual mode fiber as a result of the phenomena occurring within the remote location. The overall result is that the light is insulated from effects outside the remote location being observed.

What is claimed is:

1. A multiple parameter remote fiber optic sensing device comprising:

(a) a first length of non-elliptical optical fiber, which is polarization preserving and single mode having a first and a second end; and (b) a second gauged length of non-elliptical optical fiber, which is polarization preserving and two mode, having a first and a second end, the first end of said second gauge length of non-elliptical optical fiber connected to the second end of said first length of non-elliptical optical fiber, and wherein the second end of said gauged length of non-elliptical optical fiber is reflective.

2. The device of claim 1, further comprising: a light source located proximately to the first end of said first length of optical fiber, wherein said light source is aligned with said first length of optical fiber such that light is injected into said first length of optical fiber along both polarization axes.

3. The device of claim 2, further comprising: a means for extracting light reflected from the second end of said second gauged length of optical fiber such that each polarized light component is kept separate.

4. The device of claim 3, further comprising: a means for splitting light located proximately to said means for extracting light, wherein said splitting means is aligned with said means for extracting light such that the light is separated into its linear polarization states.

5. The device of claim 3, further comprising: a first optical detection device located in appropriate spaced relation to said splitting means to detect a first polarized light; and a second optical detection device located in appropriate spaced relation to said splitting means to detect a second polarized light.

6. The device of claim 3 wherein said means for extracting light comprises a polarization-preserving coupler.

7. The device of claim 4 wherein said means for splitting light comprises a polarization-splitting coupler.

8. A remote sensing device of claim 1 wherein said first optical fiber and said second gauged optical fiber are connected such that the polarization axes of the two fibers are aligned.

* * * * *

UNITED STATES PATENT AND TRADEMARK OFFICE
CERTIFICATE OF CORRECTION

PATENT NO. : 5,361,313
DATED : November 1, 1994
INVENTOR(S) : Christian V. O'Keefe It is certified that error appears in the above-indentified patent and that said Letters Patent is hereby corrected as shown below:

Column 1, line 7, delete "a" and insert --as--; line 48, "evans" should read --Evans--; line 61, delete "in".

Column 3, line 29, after "fringe" insert a period --.--; line 32, change "$\theta = \beta_1 z_1 - \beta_2 z_2$" to --$\theta = \beta_1 z_1 - \beta_2 z_2$--; line 57, after "signal." begin a new paragraph with the word "Now".

Column 4, line 25, "portions(s)" should read --portions--; line 37, "If" should read --In--.

Column 5, line 51, delete "fiber therefore" and insert --fiber.  Therefore--; line 66, after "coupler" insert a comma --,--.

Column 6, line 58, delete "is" and insert --it--.

Column 8, line 24, after "fiber" insert a period --.--; line 60, after "fiber" insert a period --.--.

UNITED STATES PATENT AND TRADEMARK OFFICE
CERTIFICATE OF CORRECTION

PATENT NO. : 5,361,313
DATED : November 1, 1994
INVENTOR(S) : Christian V. O'Keefe It is certified that error appears in the above-indentified patent and that said Letters Patent is hereby corrected as shown below:

Column 9, line 10, after "fiber" insert a period --.--;

line 15, change " $exp[i(\beta_{01}L_{sense} - \beta_{11}L_{sense} + \theta_{per-01} - \theta_{per-11})]$ " to -- $\exp\left[ i\left(\beta_{01}L_{sense} - \beta_{11}L_{sense} + \theta_{per-01} - \theta_{per-11}\right)\right]$ --; line 20, after "fiber" insert a period --.--; line 68, after "$z_0$" insert a period --.--.

Column 12, line 31, after "components," insert on the next line the following equation:

-- $E_y = A\, J_l(u\rho)\, e^{il\phi} \exp[i(\omega t - \beta z)]$ --;

line 44, delete "the both" and insert --both--.

Column 17, line 16, change " $\begin{bmatrix} \Delta L \\ L\Delta T \end{bmatrix} = <\Lambda>^{-1} \begin{bmatrix} \Delta\theta_1 \\ \Delta\theta_2 \end{bmatrix}$ " to -- $\begin{bmatrix} \Delta L \\ L\,\Delta T \end{bmatrix} = (\Lambda)^{-1} \begin{bmatrix} \Delta\theta_1 \\ \Delta\theta_2 \end{bmatrix}$ --; line 29, change " $<\Lambda_{York800}>^{-1} =$ "

to -- $(\Lambda_{York800})^{-1} =$ --; line 39, after "$22.5^0$" insert a period --.--.

UNITED STATES PATENT AND TRADEMARK OFFICE
CERTIFICATE OF CORRECTION

PATENT NO. : 5,361,313

DATED : November 1, 1994

INVENTOR(S) : Christian V. O'Keefe

It is certified that error appears in the above-indentified patent and that said Letters Patent is hereby corrected as shown below:

Column 18, line 19, after "mode" insert a comma --,--.

Signed and Sealed this

Twenty-third Day of April, 1996

Attest:

BRUCE LEHMAN

Attesting Officer     Commissioner of Patents and Trademarks